United States Patent
Wang et al.

(10) Patent No.: US 11,843,110 B2
(45) Date of Patent: Dec. 12, 2023

(54) METHODS FOR CONTROLLING FORMATION OF MULTILAYER CARBON COATINGS ON SILICON-CONTAINING ELECTROACTIVE MATERIALS FOR LITHIUM-ION BATTERIES

(71) Applicant: GM GLOBAL TECHNOLOGY OPERATIONS LLC, Detroit, MI (US)

(72) Inventors: Lei Wang, Rochester Hills, MI (US); Xingcheng Xiao, Troy, MI (US); Wei Li, Troy, MI (US); Mark W. Verbrugge, Troy, MI (US); Michael P. Balogh, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 374 days.

(21) Appl. No.: 16/668,882

(22) Filed: Oct. 30, 2019

(65) Prior Publication Data
US 2021/0135193 A1 May 6, 2021

(51) Int. Cl.
*H01M 4/1395* (2010.01)
*H01M 4/38* (2006.01)
(Continued)

(52) U.S. Cl.
CPC ....... *H01M 4/1395* (2013.01); *H01M 4/0471* (2013.01); *H01M 4/386* (2013.01);
(Continued)

(58) Field of Classification Search
CPC ............. H01M 4/1395; H01M 4/0471; H01M 4/386–387; H01M 4/663; H01M 2004/027; H01M 2004/028
See application file for complete search history.

(56) References Cited

U.S. PATENT DOCUMENTS 7,718,156 B2    5/2010   Zhang et al.
7,736,805 B2    6/2010   Nazri et al.
(Continued)

FOREIGN PATENT DOCUMENTS

CN    101125859 A    2/2008
CN    102460781 A    5/2012
(Continued)

OTHER PUBLICATIONS

Machine translation of WO 2017039368 A1 (Year: 2017).*
Machine translation of CN 107026258 A (Year: 2017).*
(Continued)

*Primary Examiner* — Matthew T Martin
*Assistant Examiner* — Unique Jenevieve Luna
(74) *Attorney, Agent, or Firm* — Harness, Dickey & Pierce, P.L.C.

(57) ABSTRACT

Methods of making negative electrode materials for an electrochemical cell that cycles lithium ions are provided. A surface of the electrode material formed of silicon, silicon-containing alloys, tin-containing alloys, or combinations thereof is treated with an oxidant at a first temperature of greater than or equal to about 100° C. to form a continuous intermediate layer comprising oxides. The method also includes pyrolyzing a carbon-containing precursor over the continuous intermediate layer at a second temperature of greater than or equal to about 600° C. to form a continuous carbon coating thereon. The intermediate layer oxides may be transformed to carbides. The continuous carbon coating comprises both graphitic carbon and amorphous carbon and may be a multilayered coating, where the inner layer predominantly includes amorphous carbon and the outer layer predominantly includes graphitic carbon.

15 Claims, 9 Drawing Sheets

(51) Int. Cl.
  *H01M 4/66*  (2006.01)
  *H01M 4/04*  (2006.01)
  *H01M 4/02*  (2006.01)

(52) U.S. Cl.
  CPC ........... *H01M 4/387* (2013.01); *H01M 4/663* (2013.01); *H01M 2004/027* (2013.01); *H01M 2004/028* (2013.01)

(56) References Cited

U.S. PATENT DOCUMENTS

| | | |
|---|---|---|
| 8,092,922 B2 | 1/2012 | Lev et al. |
| 8,101,152 B1 | 1/2012 | Halalay et al. |
| 8,399,138 B2 | 3/2013 | Timmons |
| 8,420,259 B2 | 4/2013 | Xiao et al. |
| 8,440,350 B1 | 5/2013 | Verbrugge et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,828,481 B2 | 9/2014 | Burton et al. |
| 8,835,056 B2 | 9/2014 | Xiao et al. |
| 8,852,461 B2 | 10/2014 | Liu et al. |
| 8,859,144 B2 | 10/2014 | Xiao |
| 8,999,584 B2 | 4/2015 | Jiang et al. |
| 9,005,811 B2 | 4/2015 | Xiao et al. |
| 9,012,075 B2 | 4/2015 | Verbrugge et al. |
| 9,034,519 B2 | 5/2015 | Xiao et al. |
| 9,059,451 B2 | 6/2015 | Xiao et al. |
| 9,093,705 B2 | 7/2015 | Xiao et al. |
| 9,142,830 B2 | 9/2015 | Xiao et al. |
| 9,153,353 B2 | 10/2015 | Liu et al. |
| 9,153,819 B2 | 10/2015 | Huang et al. |
| 9,302,914 B2 | 4/2016 | Liu et al. |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,379,374 B2 | 6/2016 | Liu et al. |
| 9,525,170 B2 | 12/2016 | Do et al. |
| 9,531,004 B2 | 12/2016 | Xiao et al. |
| 9,564,639 B2 | 2/2017 | Huang |
| 9,570,752 B2 | 2/2017 | Huang et al. |
| 9,577,251 B2 | 2/2017 | Xiao et al. |
| 9,583,767 B2 | 2/2017 | Verbrugge et al. |
| 9,627,716 B2 | 4/2017 | Yang et al. |
| 9,653,734 B2 | 5/2017 | Liu et al. |
| 9,780,361 B2 | 10/2017 | Xiao et al. |
| 9,859,554 B2 | 1/2018 | Xiao et al. |
| 9,905,847 B2 | 2/2018 | Dadheech et al. |
| 10,062,898 B2 | 8/2018 | Xiao |
| 10,141,569 B2 | 11/2018 | Verbrugge et al. |
| 10,164,245 B2 | 12/2018 | Huang |
| 10,199,643 B2 | 2/2019 | Zhou et al. |
| 10,326,136 B2 | 6/2019 | Xiao et al. |
| 10,396,360 B2 | 8/2019 | Xiao et al. |
| 10,424,784 B2 | 9/2019 | Yang et al. |
| 10,637,048 B2 | 4/2020 | Qi et al. |
| 2002/0009639 A1 | 1/2002 | Miyake et al. |
| 2006/0127773 A1 | 6/2006 | Kawakami et al. |
| 2008/0044735 A1 | 2/2008 | Ryu et al. |
| 2009/0087731 A1 | 4/2009 | Fukui et al. |
| 2009/0117466 A1 | 5/2009 | Zhamu et al. |
| 2009/0208780 A1 | 8/2009 | Sun et al. |
| 2010/0297502 A1 | 11/2010 | Zhu et al. |
| 2011/0073804 A1 | 3/2011 | Sotokawa et al. |
| 2012/0077087 A1 | 3/2012 | Cho et al. |
| 2012/0100403 A1 | 4/2012 | Wang et al. |
| 2012/0229096 A1 | 9/2012 | Nazri |
| 2012/0328927 A1 | 12/2012 | Timmons et al. |
| 2012/0328956 A1 | 12/2012 | Oguni et al. |
| 2013/0099159 A1 | 4/2013 | Halalay et al. |
| 2013/0323595 A1 | 12/2013 | Sohn et al. |
| 2013/0330619 A1 | 12/2013 | Archer et al. |
| 2015/0031216 A1* | 1/2015 | Akae ................. C23C 16/45529<br>118/704 |
| 2015/0162602 A1 | 6/2015 | Dadheech et al. |
| 2015/0236343 A1 | 8/2015 | Xiao et al. |
| 2015/0357648 A1 | 12/2015 | Sugimoto et al. |
| 2016/0043390 A1 | 2/2016 | Shin et al. |
| 2016/0164073 A1 | 6/2016 | Liu et al. |
| 2016/0172665 A1 | 6/2016 | Zhou et al. |
| 2016/0285090 A1 | 9/2016 | Ozkan et al. |
| 2017/0098817 A1 | 4/2017 | Yu et al. |
| 2017/0117538 A1 | 4/2017 | Bendimerad et al. |
| 2017/0141382 A1 | 5/2017 | Dadheech et al. |
| 2017/0271678 A1 | 9/2017 | Yang et al. |
| 2017/0338490 A1 | 11/2017 | Xiao et al. |
| 2017/0352878 A1 | 12/2017 | Kajita |
| 2018/0083281 A1* | 3/2018 | Cheng .................... C01B 32/05 |
| 2018/0123124 A1 | 5/2018 | Yang et al. |
| 2018/0205114 A1 | 7/2018 | Pauric et al. |
| 2019/0115617 A1 | 4/2019 | Pan et al. |
| 2019/0181426 A1* | 6/2019 | Park ..................... H01M 4/625 |
| 2019/0305366 A1* | 10/2019 | Wegener ............... H01M 4/625 |
| 2019/0372114 A1 | 12/2019 | Yang et al. |
| 2020/0020948 A1 | 1/2020 | Huang et al. |
| 2020/0020949 A1 | 1/2020 | Huang |
| 2020/0119339 A1 | 4/2020 | Halalay et al. |
| 2020/0127292 A1 | 4/2020 | Halalay et al. |
| 2020/0227728 A1 | 7/2020 | Huang et al. |
| 2020/0350558 A1 | 11/2020 | Jimenez et al. |
| 2020/0388824 A1 | 12/2020 | Sachdev et al. |
| 2021/0057752 A1 | 2/2021 | Jiang et al. |
| 2021/0135194 A1 | 5/2021 | Wang et al. |

FOREIGN PATENT DOCUMENTS

| | | | |
|---|---|---|---|
| CN | 103779546 A | | 5/2014 |
| CN | 104269559 A | | 1/2015 |
| CN | 104350631 A | | 2/2015 |
| CN | 104916810 A | | 9/2015 |
| CN | 105174252 A | | 12/2015 |
| CN | 105990608 A | | 10/2016 |
| CN | 107026258 A | * | 8/2017 |
| CN | 108023066 A | | 5/2018 |
| CN | 110556521 A | | 12/2019 |
| CN | 112750996 A | | 5/2021 |
| DE | 102017124894 A1 | | 5/2018 |
| DE | 102019111559 A1 | | 12/2019 |
| DE | 102020125819 A1 | | 5/2021 |
| KR | 20130094366 A | | 8/2013 |
| KR | 20140135422 A | | 11/2014 |
| WO | 2012064702 A2 | | 5/2012 |
| WO | 2013154623 A1 | | 10/2013 |
| WO | WO-2017039368 A1 * | 3/2017 | .............. H01M 4/36 |
| WO | WO-2019161288 A1 * | 8/2019 | .............. C01B 32/15 |

OTHER PUBLICATIONS

Wang, Jiangwei et al., "Structural Evolution and Pulverization of Tin Nanoparticles during Lithiation-Delithiation Cycling," Journal of The Electrochemical Society, 161 (11), F3019-F3024 (2014).

Yokoyama, Takuya et al., "Preparation of Porous Silicone Resin Sheet with Phase Inversion in Parallel with Non Solvent Induced Phase Separation and Application to Hollow Particle Formation," Materials Sciences and Applications, 2014, 5, pp. 649-659 (2014); DOI: 10.4236/msa.2014.59067.

Choi, Jang Wook et al., "Promise and reality of post-lithium-ion batteries with high energy densities", Nature Reviews Materials, vol. 1., Mar. 31, 2016, Art. No. 16013, 16 pages, DOI:10.1038/natrevmats.2016.13.

Kobayashi, Naoya et al., "Silicon/soft-carbon nanohybrid material with low expansion for high capacity and long cycle life lithium-ion battery," Journal of Power Sources, 326 (2016), pp. 235-241.

Liu, Nian et al., "A Yolk-Shell Dseign for Stabilized and Scalable Li-Ion Battery Alloy Anodes", Nano Lett. 2012, 12, pp. 3315-3321; DOI: 10.1021/nl3014814.

Qi, Gonghsin et al., U.S. Appl. No. 15/992,347, filed May 30, 2018 entitled "Silicon Anode Materials," 37 pages.

Xiao, Xingcheng et al., "Regulated Breathing Effect of Silicon Negative Electrode for Dramatically Enhanced Performance of Li-Ion Battery", Adv. Funct. Mater. 2015, 25, 1426-1433, DOI: 10.1002/adfm.201403629.

(56) References Cited

OTHER PUBLICATIONS

Yang, Li et al., U.S. Appl. No. 16/539,647, filed Aug. 13, 2019 entitled, "Negative Electrode Including Silicon Nanoparticles Having a Carbon Coating Thereon," 49 pages.

Jiang, Meng et al., U.S. Appl. No. 16/547,084, filed Aug. 21, 2019 entitled, "Multilayer Siloxane Coatings for Silicon Negative Electrode Materials for Lithium Ion Batteries," 46 pages.

First Office Action for Chinese Patent Application No. 201710984510.0 dated Jun. 30, 2020 with English language machine translation, 14 pages.

Liu, Te-Huan et al., "Structure, energy, and structural transformations of graphene grain boundaries from atomistic simulations," Carbon 49 (2011), pp. 2306-2317; (Published online: Feb. 3, 2011) DOI: 10.1016/j.carbon.2011.01.063.

Halalay, Ion C., U.S. Appl. No. 16/160,799, filed Oct. 15, 2018 entitled, "Method for Making Silicon-Containing Composite Electrodes for Lithium-Based Batteries," 47 pages.

Huang, Xiaosong et al., U.S. Appl. No. 16/249,513, filed Jan. 16, 209 entitled, "Methods of Making High Performance Electrodes," 53 pages.

Colomer, J. F. et al., "Large-scale synthesis of single-wall carbon nanotubes by catalytic chemical vapor deposition (CCVD) method," Chemcial Physics Letters, 317 (2000), pp. 83-89.

Kim, Whi Dong et al., "Tailoring the carbon nanostructure grown on the surface of Ni—Al bimetallic nanoparticles in the gas phase," Journal of Colloid and Interface Science, 362 (2011), pp. 261-266; DOI: 10.1016/j.jcs.2011.06.043 (Publsihed online: Jun. 25, 2011).

Zheng, Guo-Bin et al., "A model for the structure and growth of carbon nanofibers synthesized by the CVD method using nickel as a catalyst," Carbon, 42 (2004), pp. 635-640; DOI: 10.1016/j.carbon. 2003.12.077.

First Office Action for Chinese Patent Application No. 202011194185.6 dated Sep. 27, 2023, with correspondence from China Patent Agent (H.K.) Ltd. summarizing Office Action; 10 pages.

\* cited by examiner

METHODS FOR CONTROLLING FORMATION OF MULTILAYER CARBON COATINGS ON SILICON-CONTAINING ELECTROACTIVE MATERIALS FOR LITHIUM-ION BATTERIES

INTRODUCTION

This section provides background information related to the present disclosure which is not necessarily prior art.

The present disclosure pertains to methods of forming electroactive materials for use in negative electrodes of lithium ion electrochemical cells. The negative electroactive materials have a multilayer carbon coating formed thereon to minimize or prevent fracturing of the plurality of negative electroactive material particles as they expand and contract during lithium ion cycling. The methods include treating the negative electroactive material to form an oxide layer, followed by pyrolysis of carbon-containing precursors.

By way of background, high-energy density, electrochemical cells, such as lithium ion batteries can be used in a variety of consumer products and vehicles, such as Hybrid Electric Vehicles (HEVs) and Electric Vehicles (EVs). Typical lithium ion and lithium sulfur batteries comprise a first electrode (e.g., a cathode), a second electrode (e.g., an anode), an electrolyte material, and a separator. Often a stack of battery cells is electrically connected to increase overall output. Conventional lithium ion batteries operate by reversibly passing lithium ions between the negative electrode and the positive electrode. In a liquid battery, a separator and an electrolyte may be disposed between the negative and positive electrodes. The liquid electrolyte is suitable for conducting lithium ions and may be in solid or liquid form. A solid-state battery incorporates a solid-state electrolyte that serves as both a conductor of lithium ions and a separator, such that a distinct separator component is not required. Lithium ions move from a cathode (positive electrode) to an anode (negative electrode) during charging of the battery, and in the opposite direction when discharging the battery.

Contact of the anode and cathode materials with the electrolyte can create an electrical potential between the electrodes. When electric current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Typical electrochemically active materials for forming an anode include lithium-graphite intercalation compounds, lithium-silicon alloying compounds, lithium-tin alloying compounds, lithium alloys. While graphite compounds are most common, recently, anode materials with high specific capacity (in comparison with conventional graphite) are of growing interest. For example, silicon has the highest known theoretical charge capacity for lithium, making it one of the most promising materials for rechargeable lithium ion batteries. However, current anode materials comprising silicon can potentially suffer from significant drawbacks.

For example, excessive volumetric expansion and contraction during successive charging and discharging cycles is observed for silicon electroactive materials. Such volumetric changes can lead to fatigue cracking and decrepitation of the electroactive material. This may potentially lead to a loss of electrical contact between the silicon-containing electroactive material and the rest of the battery cell, resulting in a decline of electrochemical cyclic performance, diminished Coulombic charge capacity retention (capacity fade), and limited cycle life. This is especially true at electrode loading levels required for the application of silicon containing electrodes in high-energy lithium ion batteries, such as those used in transportation applications.

Accordingly, it would be desirable to develop materials and methods that use silicon or other electroactive materials that undergo significant volumetric changes during lithium ion cycling that are capable of minimal capacity fade and maximized charge capacity in commercial lithium ion batteries with long lifespans, especially for transportation applications.

SUMMARY

This section provides a general summary of the disclosure, and is not a comprehensive disclosure of its full scope or all of its features.

The present disclosure relates to a method of making a negative electrode material for an electrochemical cell that cycles lithium ions. In certain aspects, the method includes treating a surface of a negative electrode material with an oxidant at a first temperature of greater than or equal to about 100° C. to form a continuous intermediate layer including oxides. The negative electrode material is selected from the group consisting of: silicon, silicon-containing alloys, tin-containing alloys, and combinations thereof. The method also includes pyrolyzing a carbon-containing precursor over the continuous intermediate layer at a second temperature of greater than or equal to about 600° C. to form a continuous carbon coating thereon. The continuous carbon coating includes both graphitic carbon and amorphous carbon.

In one aspect, during the pyrolyzing, at least a portion of the oxides in the intermediate layer transform into carbides.

In one aspect, the first temperature range is greater than or equal to about 100° C. to less than or equal to about 1,000° C.

In one aspect, the second temperature range is greater than or equal to about 600° C. to less than or equal to about 1,400° C.

In one aspect, the continuous carbon coating includes greater than or equal to about 20% by volume to less than or equal to about 50% by volume of graphitic carbon and greater than or equal to about 50% by volume to less than or equal to about 80% by volume of amorphous carbon.

In one aspect, the intermediate layer has a thickness of greater than or equal to about 1 nm to less than or equal to about 20 nm.

In one aspect, the continuous carbon coating has a thickness of greater than or equal to about 1 nm to less than or equal to about 200 nm.

In one aspect, the continuous carbon coating defines an inner first region adjacent to the intermediate layer and an outer second region disposed over the inner first region. The first region includes amorphous carbon and has a thickness of greater than or equal to about 1 nm to less than or equal to about 150 nm. The second region includes graphitic carbon and has a thickness of greater than or equal to about 1 nm to less than or equal to about 50 nm.

In one aspect, the treating and the pyrolyzing are both gas phases processes conducted in the same reaction chamber.

In one aspect, the carbon-containing precursor includes a hydrocarbon gas selected from the group consisting of:

methane ($CH_4$), ethane ($C_2H_6$), propane ($C_3H_8$), butane ($C_4H_{10}$), pentane ($C_5H_{12}$), hexane ($C_6H_{14}$), heptane ($C_7H_{16}$), octane ($C_8H_{18}$), acetylene ($C_2H_2$), toluene ($C_7H_8$), natural gas, and combinations thereof.

In one aspect, the oxidant is selected from the group consisting of: oxygen ($O_2$), ozone ($O_3$), water ($H_2O$), hydrogen peroxide ($H_2O_2$), carbon monoxide (CO), and combinations thereof.

In one aspect, the treating is conducted in a reactor and the oxidant is present at greater than or equal to about 1% by weight to less than or equal to about 50% by weight of an environment in the reactor. The pyrolyzing is also conducted in the reactor and the carbon-containing precursor is present at greater than or equal to about 1% by weight to less than or equal to about 20% by weight of the environment in the reactor.

In one aspect, one or more of the treating and the pyrolyzing are conducted in the presence of an additive selected from the group consisting of: ammonia ($NH_3$), hydrogen ($H_2$), carbon monoxide (CO), and combinations thereof.

The present disclosure further relates to a method of making a negative electrode material for an electrochemical cell that cycles lithium ions. The method includes treating a surface of a negative electrode material with a first gas including an oxidant in a reactor at a first temperature of greater than or equal to about 100° C. to form a continuous intermediate layer including oxides. The negative electrode material is selected from the group consisting of: silicon, silicon-containing alloys, tin-containing alloys, and combinations thereof. The method also includes cooling the negative electrode material having the continuous intermediate layer in an inert atmosphere to a temperature of less than or equal to about 100° C. Further, the method includes introducing a second gas including a carbon-containing precursor into the chamber at a second temperature of greater than or equal to about 600° C. to pyrolyze the carbon-containing precursor to form a multilayered continuous carbon coating over the continuous intermediate layer. The multilayered continuous carbon coating includes a first layer including amorphous carbon and a second layer including graphitic carbon.

In one aspect, the oxides in the intermediate layer transform to carbides as the continuous carbon coating is formed.

In one aspect, the first temperature range is greater than or equal to about 100° C. to less than or equal to about 1,000° C. and the second temperature range is greater than or equal to about 600° C. to less than or equal to about 1,400° C.

In one aspect, the first layer is greater than or equal to about 20% by volume to less than or equal to about 50% by volume of the continuous carbon coating and the second layer is greater than or equal to about 50% by volume to less than or equal to about 80% by volume of the continuous carbon coating.

In one aspect, the continuous carbon coating has a thickness of greater than or equal to about 2 nm to less than or equal to about 200 nm. The first layer has a thickness of greater than or equal to about 1 nm to less than or equal to about 150 nm, while the second layer has a thickness of greater than or equal to about 1 nm to less than or equal to about 50 nm.

In one aspect, the oxidant is selected from the group consisting of: oxygen ($O_2$), ozone ($O_3$), water ($H_2O$), hydrogen peroxide ($H_2O_2$), carbon monoxide (CO), and combinations thereof and the carbon-containing precursor includes a hydrocarbon gas selected from the group consisting of: methane ($CH_4$), ethane ($C_2H_6$), propane ($C_3H_8$), butane ($C_4H_{10}$), pentane ($C_5H_{12}$), hexane ($C_6H_{14}$), heptane ($C_7H_{16}$), octane ($C_8H_{18}$), acetylene ($C_2H_2$), toluene ($C_7H_8$), natural gas, and combinations thereof.

The present disclosure further relates to a negative electrode material for use in an electrochemical cell that cycles lithium ions. The negative electrode material includes a negative electroactive material selected from the group consisting of: silicon, silicon-containing alloys, tin-containing alloys, and combinations thereof. A continuous intermediate layer including carbides is disposed on a surface of the negative electroactive material. Further, a multilayered carbon coating including an inner first layer including amorphous carbon disposed adjacent to the continuous intermediate layer and an outer second layer including graphitic carbon.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
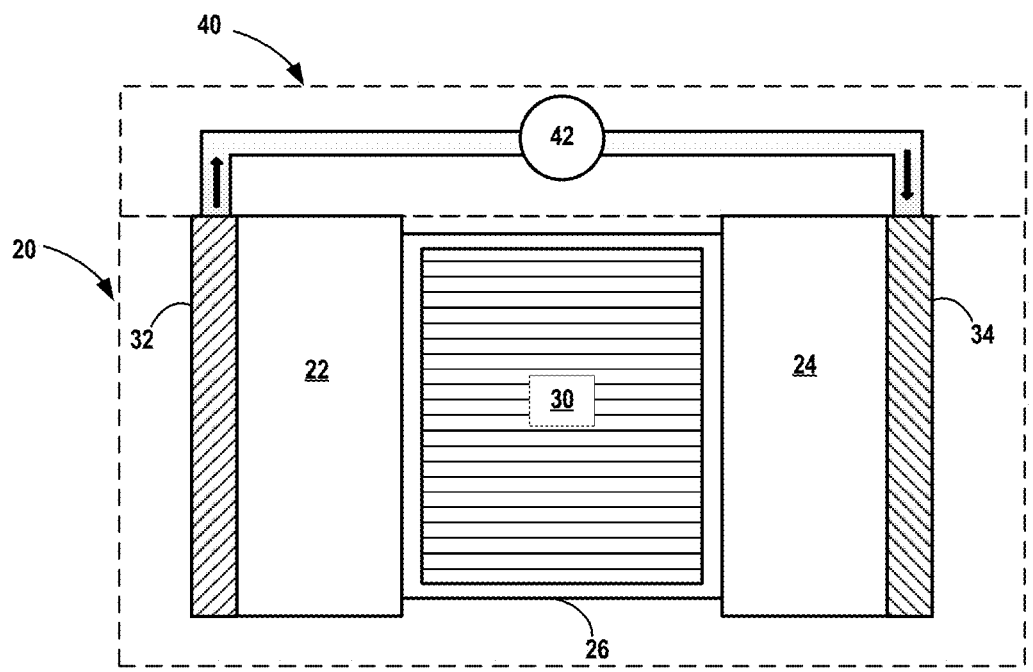
FIG. 1 is a schematic of an example electrochemical battery cell.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

The present technology pertains to improved electrochemical cells, especially lithium-ion batteries. In various instances, such cells are used in vehicle or automotive transportation applications. However, the present technology may be employed in a wide variety of other applications.

An exemplary illustration of an electrochemical cell or battery for cycling lithium ions is shown in FIG. 1. The battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. An interruptible external circuit 40 and load 42 connects the negative electrode 22 (through its current collector 32) and the positive electrode 24 (through its current collector 34).

The battery 20 can generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte solution 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the negative electrode 22 so that electrons and lithium ions are produced. The electrons, which flow back towards the positive electrode 24 through the external circuit 40, and the lithium ions, which are carried by the electrolyte solution 30 across the separator 26 back towards the positive electrode 24, reunite at the positive electrode 24 and replenish it with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative current collector 32, negative electrode 22, the separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. The negative electrode current collector 32 and positive electrode current collector 34 respectively collect and move free electrons to and from an external circuit 40.

Further, the separator 26 operates as an electrical insulator by being sandwiched between the negative electrode 22 and the positive electrode 24 to prevent physical contact and thus, the occurrence of a short circuit. The separator 26 provides not only a physical and electrical barrier between the two electrodes 22, 24, but also contains the electrolyte solution in a network of open pores during the cycling of lithium ions, to facilitate functioning of the battery 20.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 described above includes a liquid electrolyte and shows representative concepts of battery operation. However, the battery 20 may also be a solid-state battery that includes a solid-state electrolyte that may have a different design, as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20.

In certain aspects, the electrolyte 30 may be a non-aqueous liquid electrolyte solution that includes one or more lithium salts dissolved in an organic solvent or a mixture of organic solvents. Numerous aprotic non-aqueous liquid electrolyte solutions may be employed in the lithium-ion battery 20. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), and combinations thereof.

These and other similar lithium salts may be dissolved in a variety of aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVDF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

In various aspects, the porous separator 26 and the electrolyte 30 may be replaced with a solid-state electrolyte (SSE) (not shown) that functions as both an electrolyte and a separator. The SSE may be disposed between the positive electrode 24 and negative electrode 22. The SSE facilitates transfer of lithium ions, while mechanically separating and providing electrical insulation between the negative and positive electrodes 22, 24. By way of non-limiting example, SSEs may include $LiTi_2(PO4)_3$, $LiGe_2(PO_4)_3$, $Li_7La_3Zr_2O_{12}$, $Li_3xLa_{2/3}-xTiO_3$, $Li_3PO_4$, $Li_3N$, $Li_4GeS_4$, $Li_{10}GeP_2S_{12}$, $Li_2S—P_2S_5$, $Li_6PS_5Cl$, $Li_6PS_5Br$, $Li_6PS_5I$, $Li_3OCl$, $Li_{2.99}Ba_{0.005}ClO$, or combinations thereof.

The positive electrode 24 may be formed from a lithium-based active material that can sufficiently undergo lithium intercalation and deintercalation, or alloying and dealloying, while functioning as the positive terminal of the battery 20. One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O2$), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$), lithium manganese-iron phosphate ($LiMn_{2-x}Fe_xPO_4$, where $0<x<0.3$), or lithium iron fluorophosphate ($Li_2FePO_4F$).

In certain variations, the positive electroactive materials may be intermingled with an electronically conducting material that provides an electron conduction path and/or at least one polymeric binder material that improves the structural integrity of the electrode. For example, the electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used. The positive electrode current collector 34 may be formed from aluminum (Al) or any other appropriate electrically conductive material known to those of skill in the art.

The negative electrode 22 includes an electroactive material as a lithium host material capable of functioning as a negative terminal of a lithium ion battery. The negative electrode current collector 32 may comprise a metal comprising copper, nickel, or alloys thereof or other appropriate electrically conductive materials known to those of skill in the art. In certain aspects, the positive electrode current collector 34 and/or negative electrode current collector 32 may be in the form of a foil, slit mesh, and/or woven mesh.

In certain aspects, the present disclosure provides improved negative electrodes 22 (e.g., anodes) that incorporate improved electrochemically active negative electrode materials. The negative electroactive materials suffer from significant volumetric expansion during lithium cycling (e.g., capable of accepting the insertion of lithium ions during charging of the electrochemical cell via lithiation or "intercalation" and releasing lithium ions during discharging of the electrochemical cell via delithiation or "deintercalation" or lithium alloying/dealloying). Such an electrochemically active negative electrode material may be selected from the group consisting of: silicon, silicon-containing alloys, tin-containing alloys, and combinations thereof. By way of example, electroactive material particles comprising silicon may include silicon, or silicon containing binary and ternary alloys and/or tin-containing alloys, such as Si—Sn, SiSnFe, SiSnAl, SiFeCo, $SnO_2$, and the like. In accordance with various aspects of the present teachings, a negative electroactive material can be incorporated into a negative electrode in an electrochemical cell.

Figure 2:
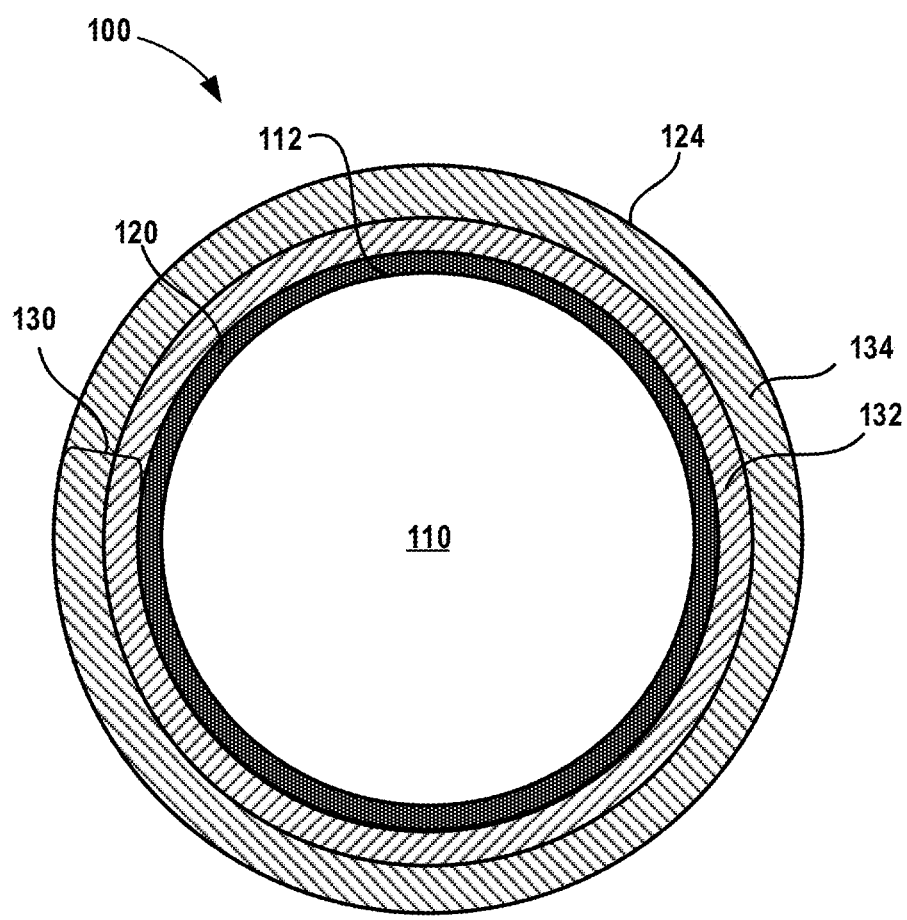
FIG. 2 is an illustration of a cross-sectional view of a negative electroactive material particle having a multilayer carbon coating and an intermediate layer prepared in accordance with certain aspects of the present disclosure.

For example, as shown in FIG. 2, a negative electroactive particle 100 comprising a silicon-containing material forms a core region 110 that is capable of undergoing a significant volume expansion during lithium cycling, for example, during lithium ion intercalation or lithium alloying. In an initial state prior to lithium ion insertion or reaction, the core region 110 is in a first contracted state. After lithium ion insertion/intercalation or alloying, the particle 100 will be in a second expanded state having a much greater volume (not shown). For example, where the core region 110 is a silicon particle (Si) in the first contracted state, after lithium ion insertion it forms $Li_{4.4}Si$ (corresponding to the second expanded state). The volume of a silicon particle defining the core region 110 after lithium insertion in the second expanded state may be up to three (3) times (300%) larger than the volume of silicon particle in the first contracted state. As will be appreciated, the first contracted state may correspond to the volume of the core region 110 before lithium insertion or after lithium extraction. For a conventional silicon electroactive material, the extent of volumetric expansion that occurs can cause the silicon particle to mechanically degrade and break into a plurality of smaller fragments or pieces. When the particle breaks into smaller pieces, these fragments or smaller pieces can no longer maintain performance of the electrochemical cell.

By way of non-limiting example, electroactive particles comprising silicon that form the core region 110 may have an average particle size (D50) in a contracted state ranging from greater than or equal to about 10 nm to less than or equal to about 50 μm, optionally greater than or equal to about 50 nm to less than or equal to about 10 μm, and in certain variations, ranging from greater than or equal to about 150 nm to less than or equal to about 5 μm.

With renewed reference to FIG. 2, the negative electroactive particle 100 includes the core region 110 having a surface 112. It should be noted that the features in FIG. 2 are not necessarily shown to scale, but rather are merely provided for purposes of illustration. An optional intermediate layer 120 is disposed over the surface 112, which as will be described further below, is initially formed in a treatment step to ensure continuous surface coverage of a subsequently applied coating and may remain after processing or alternatively may be reacted and absorbed when the subsequent coating is applied. The intermediate layer 120 initially is formed of oxides (for example, silicon oxides ($SiO_x$)), but after processing, may comprise carbides (silicon carbide). Overall, the coated negative electroactive particle 110 may have less than or equal to about 15% by weight of silicon oxides to a weight of the overall particle, including the electroactive material. In certain variations, the intermediate layer 120 may have a thickness of greater than or equal to about 1 nm to less than or equal to about 20 nm; optionally greater than or equal to about 3 nm to less than or equal to about 20 nm, and in certain variations, optionally greater than or equal to about 3 nm to less than or equal to about 10 nm.

A continuous multilayer carbon coating 130 is disposed over the intermediate layer 120 on the surface 112. The multilayer carbon coating 130 is capable of minimizing or preventing fracturing of the negative electrode material 100 during lithium ion cycling. Furthermore, the multilayer carbon coating 130 is electrically conductive and ionically conductive. The multilayer carbon coating 130 comprises at least two distinct layers. An inner first layer 132 comprises a carbon-containing or carbonaceous material. In certain aspects, the inner first layer 132 comprises an amorphous carbon that generally lacks any crystalline structure or ordering. Amorphous carbon generally has superior mechanical properties, such as tensile strength, for withstanding the volumetric changes of the electroactive material.

An outer second layer 134 also comprises a carbon-containing carbonaceous material, but will have a different structure than the inner first layer 132. For example, in certain aspects, the outer second layer 134 may comprise a graphitic carbon, which is crystalline and has ordering. As will be described further below, graphitic carbon exhibits good electrical conductivity. Generally, the graphitic carbon may have an sp2/sp3 ratio of bonds ranging from about 70:30 to about 100:1. In an example, the ratio of $sp^2$ carbon to $sp^3$ carbon in the carbon coating may be about 74 to about 26. As the inner first layer 132 and the outer second layer 134 are formed in a pyrolysis process, there may not be a distinct compositional delineation between the layers, but rather a gradient region between the respective compositions that define different regions or layers. The outer second layer 134 comprising graphitic carbon provides good electrical conductivity, including good connection between adjacent electroactive particles.

In certain variations, the multilayer carbon coating 130 may have a thickness corresponding to a size of the electroactive material particle. For example, the coated negative electroactive particle 110 may have greater than or equal to about 1% to less than or equal to about 50% by weight of the multilayer carbon coating 130 to a weight of the overall particle, including the electroactive material particle 110. In certain variations, the multilayer carbon coating 130 may have a thickness of greater than or equal to about 2 nm to less than or equal to about 200 nm; optionally greater than or equal to about 2 nm to less than or equal to about 100 nm, optionally greater than or equal to about 5 nm to less than or equal to about 50 nm, and optionally greater than or equal to about 10 nm to less than or equal to about 50 nm.

The inner first layer 132 may be greater than or equal to about 1% to less than or equal to about 30% by weight of a weight of the overall particle, including the electroactive material particle 110. In certain variations, the inner first layer 132 may have a thickness of greater than or equal to about 1 nm to less than or equal to about 175 nm; optionally greater than or equal to about 2 nm to less than or equal to about 150 nm, optionally greater than or equal to about 3 nm to less than or equal to about 100 nm, optionally greater than or equal to about 3 nm to less than or equal to about 50 nm, optionally greater than or equal to about 5 nm to less than or equal to about 20 nm, and in certain variations, optionally greater than or equal to about 5 nm to less than or equal to about 10 nm.

The outer second layer 134 may be greater than or equal to about 1% to less than or equal to about 30% by weight of a weight of the overall particle, including the electroactive material particle 110. In certain variations, the outer second layer 134 may have a thickness that is less than a thickness of the inner first layer 132. The outer second layer 134 may have a thickness of greater than or equal to about 1 nm to less than or equal to about 100 nm; optionally greater than or equal to about 2 nm to less than or equal to about 50 nm, optionally greater than or equal to about 2 nm to less than or equal to about 25 nm, optionally greater than or equal to about 2 nm to less than or equal to about 20 nm, optionally greater than or equal to about 3 nm to less than or equal to about 10 nm, and in certain variations, optionally greater than or equal to about 3 nm to less than or equal to about 5 nm.

In various aspects, the multilayer carbon coating 130 is a thin continuous layer applied to the surface of the negative electroactive material 110 to provide sufficient coverage to protect the underlying electroactive material during volumetric size changes to minimize or avoid cracking, fracture, decrepitation of the electroactive material during lithium cycling and thus minimizing capacity loss and poor cycle life. In certain aspects, a continuous coating may be one that covers greater than or equal to about 90% to less than or equal to about 100% of the exposed surface area of the electroactive material and in certain aspects, optionally greater than or equal to about 95% to less than or equal to about 100%, and optionally greater than or equal to about 99% to less than or equal to about 100% of the exposed surface area of the electroactive material.

In certain aspects, a lithium-ion battery incorporating an inventive negative electroactive material having a multilayer carbon coating substantially maintains charge capacity (e.g., performs within a preselected range or other targeted high capacity use) for at least about 1,000 hours of battery operation, optionally greater than or equal to about 1,500 hours of battery operation, optionally greater than or equal to about 2,500 hours or longer of battery operation, and in certain aspects, optionally greater than or equal to about 5,000 hours or longer (active cycling).

In certain aspects, the lithium-ion battery incorporating an inventive negative electroactive/electrode material having a multilayer coating maintains charge capacity and thus is capable of operating within 20% of target charge capacity for a duration of greater than or equal to about 2 years (including storage at ambient conditions and active cycling time), optionally greater than or equal to about 3 years, optionally greater than or equal to about 4 years, optionally greater than or equal to about 5 years, optionally greater than or equal to about 6 years, optionally greater than or equal to about 7 years, optionally greater than or equal to about 8 years, optionally greater than or equal to about 9 years, and in certain aspects, optionally greater than or equal to about 10 years.

In other aspects, the lithium-ion battery incorporating an inventive electrode material having a multilayer surface coating is capable of operating at less than or equal to about 30% change in a preselected target charge capacity (thus having a minimal charge capacity fade), optionally at less than or equal to about 20%, optionally at less than or equal to about 15%, optionally at less than or equal to about 10%, and in certain variations optionally at less than or equal to about 5% change in charge capacity for a duration of at least about 100 deep discharge cycles, optionally at least about 200 deep discharge cycles, optionally at least about 500 deep discharge cycles, optionally at least about 1,000 deep discharge cycles.

Stated in another way, in certain aspects, a lithium-ion battery or electrochemical cell incorporating the inventive negative electroactive material having a multilayer carbon surface coating substantially maintains charge capacity and is capable of operation for at least about 1,000 deep discharge cycles, optionally greater than or equal to about 2,000 deep discharge cycles, optionally greater than or equal to about 3,000 deep discharge cycles, optionally greater than or equal to about 4,000 deep discharge cycles, and in certain variations, optionally greater than or equal to about 5,000 deep discharge cycles.

Figure 3:
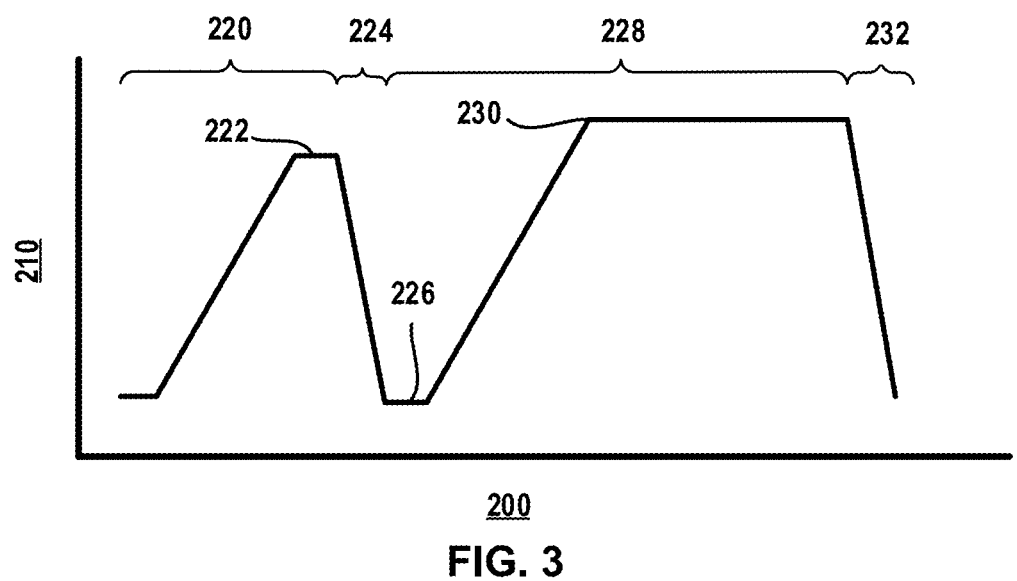
FIG. 3 is an illustration of a process for forming a negative electroactive material particle having a multilayer carbon coating and an intermediate layer in accordance with certain aspects of the present disclosure.

Thus, in accordance with certain aspects of the present disclosure, methods are provided for making a negative electrode material for an electrochemical cell that cycles lithium ions, as described above. The method may be a two-step process that applies a continuous multilayer carbon coating onto electroactive material particles, like silicon particles. In certain aspects, the method occurs all in a gas phase reactor where gas phase reactions occur on the surface of the solid electroactive material. The process involves an initial controlled oxidation process step, followed by subsequent hydrocarbon reduction that leads to forming a double-layer carbon structure. Such a method is shown in FIG. 3, where time is the x-axis labeled 200 and temperature is the y-axis labeled 210.

In a first step 200, a surface of a negative electrode material is treated with a gas stream comprising an oxidant to form a continuous intermediate layer comprising oxides. In this manner, the surface of the negative electrode material is oxidized via reactants in a gaseous phase. The oxidant is selected from the group consisting of: oxygen ($O_2$), ozone ($O_3$), water ($H_2O$), hydrogen peroxide ($H_2O_2$), carbon monoxide (CO), and combinations thereof. The electroactive material may be treated in a reactor, such as a gas phase reactor chamber, where the oxidant is introduced by a gas stream and present in the reactor at greater than or equal to about 1% by weight to less than or equal to about 50% by weight of an overall atmosphere in the reactor, optionally at greater than or equal to about 10% by weight to less than or equal to about 25% by weight with a balance being inert gases, like argon or helium. In one variation, the oxidant may be oxygen ($O_2$) and be present at about 10% by weight. As in the variations described above, the negative electrode material is selected from the group consisting of: silicon, silicon-containing alloys, tin-containing alloys, and combinations thereof In the first step, 220, the negative electrode material may be heated from a temperature of below 100° C. up to a first temperature 222 for oxidation.

The treating in the first step 220 may occur at the first temperature 222 of greater than or equal to about 100° C. In certain aspects, the first temperature 222 may be greater than or equal to about 100° C. to less than or equal to about 1,000° C., optionally greater than or equal to about 100° C. to less than or equal to about 900° C., and in certain variations, optionally greater than or equal to about 200° C. to less than or equal to about 800° C. In one variation, the first temperature 222 may be about 800° C.

In the embodiment where the negative electroactive material comprises silicon, the oxides may be silicon oxides, such as $SiO_x$, where x is about 1.5. Various models can be used to provide suitable conditions for the oxidation step, such as the Deal-Grove model or Massoud model. By way of example, assuming a native oxide film is about 2 nm thick, heat treating a silicon material in 10% oxygen at 800° C. for 10 minutes is predicted to provide a continuous surface oxide film with a thickness of anywhere from about 2.4 nm to 4.4 nm. In certain aspects, the duration of the first treatment step 220 for oxidizing the negative electroactive material is greater than or equal to about 5 minutes to less than or equal to about 60 minutes, optionally greater than or equal to about 10 minutes to less than or equal to about 45 minutes, and in certain aspects, optionally greater than or equal to about 15 minutes to less than or equal to about 30 minutes. Operating pressures during the first step 220 may be ambient pressures.

In alternative variations, rather than being conducted in a reaction chamber of a gas phase reactor, the first step 220 may be conducted in a ball mill, where the electroactive material particles are milled in the presence of an oxidant, like oxygen (e.g., by being exposed to air or water).

After a sufficient level of oxidation occurs on the negative electrode material, the negative electrode material having the continuous intermediate oxide layer may be subjected to a first cooling process 224 that can be conducted in an inert atmosphere, such as in helium, argon, or the like. In the first cooling process 224, the negative electrode material may be cooled to a second temperature 226 of less than or equal to about 100° C., for example.

Next, the method comprises a pyrolysis step 228, where the negative electrode material having the intermediate layer of surface oxides is further treated by heating and reaction. Thus, the method includes introducing a carbon-containing precursor into a reaction chamber of a reactor. In the pyrolysis step 228, the carbon-containing precursor is pyrolyzed over the continuous intermediate layer to form a continuous carbon coating thereon. The pyrolyzing serves as a deposition and carbonization process. As noted above, in certain variations, gas phase reactions are employed to form the coatings on the negative electroactive material. Thus, the carbon-containing precursor may be in a gas phase. In certain variations, the carbon-containing precursor comprises a hydrocarbon gas selected from the group consisting of: methane ($CH_4$), ethane ($C_2H_6$), propane ($C_3H_8$), butane ($C_4H_{10}$), pentane ($C_5H_{12}$), hexane ($C_6H_{14}$), heptane ($C_7H_{16}$), octane ($C_8H_{18}$), acetylene ($C_2H_2$), toluene ($C_7H_8$), natural gas, and combinations thereof. In one variation, the carbon-containing precursor may be methane ($CH_4$) and be present at about 10% by weight of a total atmosphere in a reactor with a balance being inert gases, like argon or helium.

The continuous carbon coating formed comprises both graphitic carbon and amorphous carbon. The pyrolyzing may be conducted at a third temperature 230 of greater than or equal to about 600° C. and in certain aspects, optionally at greater than or equal to about 600° C. to less than or equal to about 1,400° C. In certain variations, the third temperature 230 may be greater than or equal to about 950° C. to less than or equal to about 1,030° C. The pyrolyzing may be conducted from ambient pressures up to about 30 psi (207 kPa) in the reactor. In certain aspects, the duration of the pyrolyzing step 228 is greater than or equal to about 30 minutes to less than or equal to about 600 minutes, optionally greater than or equal to about 60 minutes to less than or equal to about 360 minutes, and in certain aspects, optionally greater than or equal to about 120 minutes to less than or equal to about 240 minutes.

In certain aspects, the carbon deposition during the pyrolysis step 228 can be highly controlled. Longer carbon deposition times provide thicker carbon coatings. Further, temperature during the pyrolysis step can be used to control an sp2 to sp3 ratio of the carbon coating formed. Generally, the greater the temperature, the greater the amount of sp2 carbon that is formed. A lower carbonization temperature tends to form more sp3 carbon, which has superior mechanical properties for withstanding the volumetric changes of the electroactive material. A higher third temperature 230 also promotes more crystallization of the carbon material, leading to more graphitization of the carbon, which results in greater electrical conductivity. Gas concentration and type of gases can also control the loading of the carbon coating and its composition. Thus, a variety of continuous carbon coatings described previously above can be made by such processes in a highly controlled manner.

As noted above, the carbon layer comprises both amorphous carbon and graphitic carbon, which may be generally separated into regions of the continuous carbon coating over the surface of the electroactive material. An inner layer comprises the amorphous carbon, while an exposed outer layer comprises the graphitic carbon. As will be appreciated by those of skill in the art, the inner layer may also comprise graphitic compounds, but has a majority of amorphous carbon. Likewise, the outer layer may contain amorphous compounds, but is predominantly a graphitic composition. The inner carbon layer comprising amorphous carbon may have a greater thickness than the outer carbon layer comprising graphitic carbon. As the inner layer and the outer layer are formed in the pyrolysis process 228, as will be further appreciated by those of skill in the art, there may not be a distinct compositional delineation between the layers, but rather an interface region between the respective compositions defining a compositional gradient between regions or layers having different compositions.

It should be noted that the presence of the intermediate oxide layer facilitates formation of a continuous layer of the carbon coating over the surface of the electroactive material. For example, a SiOx layer serves as an intermediate surface over which a uniform and contiguous carbon coating on silicon-containing particles can be formed. Thus, in accordance with various aspects of the present disclosure, the pre-oxidation step (first step 220) provides a carbon coating that is uniform and conformal on the electroactive material surface.

During the pyrolyzing step 228, the intermediate layer on the surface of the electroactive material that comprises oxides can transform to a layer comprising carbides. In certain variations, the heat and reaction with carbon can cause the oxides, such as silicon oxides, to react to form silicon carbides. Silicon carbide is a desirable interlayer, as it can provide good mechanical protection and serve to suppress fracturing of the underlying electrode material during volumetric changes. However, in other aspects, under certain conditions, the oxides may volatilize from the surface as the carbonization/pyrolysis process In certain aspects, one or more of the treating in the first step 220 and the pyrolyzing in the pyrolysis step 228 are conducted in the presence of an additive selected from the group consisting of: ammonia ($NH_3$), hydrogen ($H_2$), carbon monoxide (CO), and combinations thereof.

The gas phase reactor in which the electroactive material can be coated may be a fluidized bed reactor, a rotary reactor, a tube furnace, a thermal chamber with gas flows and the like. For example, oxidation and pyrolysis may be conducted in an apparatus having a reaction chamber with a holder for the material to be coated, at least one source of gas (e.g., the oxidant or carbon-containing precursor provided in an inert gas stream) and various controls by which the substrate may be individually subjected to the vapor source. Such controls may include heaters, coolers, flow routing and valves, for controlling the amount of exposure of the substrate to the vapor source. The regions of the electrode material to be coated may be pre-treated, for example, by plasma treatment with an oxidant. The process for pyrolysis and deposition of surface carbon coating onto regions of the electrode material involves heating and reaction of the surface in a deposition chamber with a single vapor of the carbon-containing precursor material. The vapor may be pulsed into the deposition chamber on a carrier gas and may be quickly purged, for example, by vacuum pumping or flushing with an inert gas. Such pulsing of the vapor and purging of the system may be performed to control the dose of the precursor vapor to which the substrate is exposed.

Negative electrodes may comprise greater than or equal to about 50% to less than or equal to about 90% of an electroactive material (e.g., silicon-containing particles prepared in accordance with the present disclosure), optionally greater than or equal to about 5% to less than or equal to about 30% of an electrically conductive material, and a balance binder. Suitable electroactive materials are those discussed previously above. Electrically conductive materials are well known in the art and include graphite, carbon black, carbon nanotubes, powdered nickel, conductive metal particles, conductive polymers, and combinations thereof. Useful binders include any of those described above. For example, useful binders may comprise a polymeric material and extractable plasticizer suitable for forming a bound porous composite, such as halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, carboxy methyl cellulose (CMC), and mixtures thereof.

An electrode may be made by mixing the electrode active material, such as coated silicon-containing powder or particles, into a slurry with a polymeric binder compound, a non-aqueous solvent, optionally a plasticizer, and optionally if necessary, electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate, it may be necessary to extract or remove the remaining plasticizer prior to incorporation into the battery cell.

A battery may thus be assembled in a laminated cell structure, comprising an anode layer, a cathode layer, and electrolyte/separator between the anode and cathode layers. The anode and cathode layers each comprise a current collector. A negative anode current collector may be a copper collector foil, which may be in the form of an open mesh grid or a thin film. The current collector can be connected to an external current collector tab.

For example, in certain variations, an electrode membrane, such as an anode membrane, comprises the electrode active material (e.g., carbon coated silicon-containing particles) dispersed in a polymeric binder matrix over a current collector. The separator can then be positioned over the negative electrode element, which is covered with a positive electrode membrane comprising a composition of a finely divided lithium insertion compound in a polymeric binder matrix. A positive current collector, such as aluminum collector foil or grid completes the assembly. Tabs of the current collector elements form respective terminals for the battery. A protective bagging material covers the cell and prevents infiltration of air and moisture. Into this bag, a liquid electrolyte may be injected into the separator (and may be imbibed into the positive and/or negative electrodes) suitable for lithium ion transport. In certain aspects, the laminated battery is further hermetically sealed prior to use.

Various embodiments of the inventive technology can be further understood by the specific examples contained herein. Specific Examples are provided for illustrative purposes of how to make and use the compositions, devices, and methods according to the present disclosure and, unless explicitly stated otherwise, are not intended to be a representation that given embodiments of this invention have, or have not, been made or tested.

EXAMPLE 1

Figure 4:
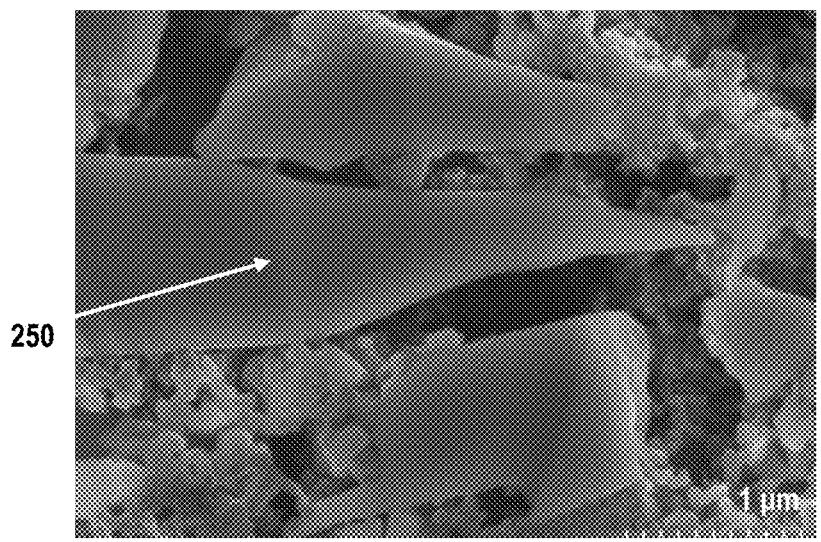
FIG. 4 is a scanning electron microscopy (SEM) image of an uncoated silicon particle.
Figure 5:
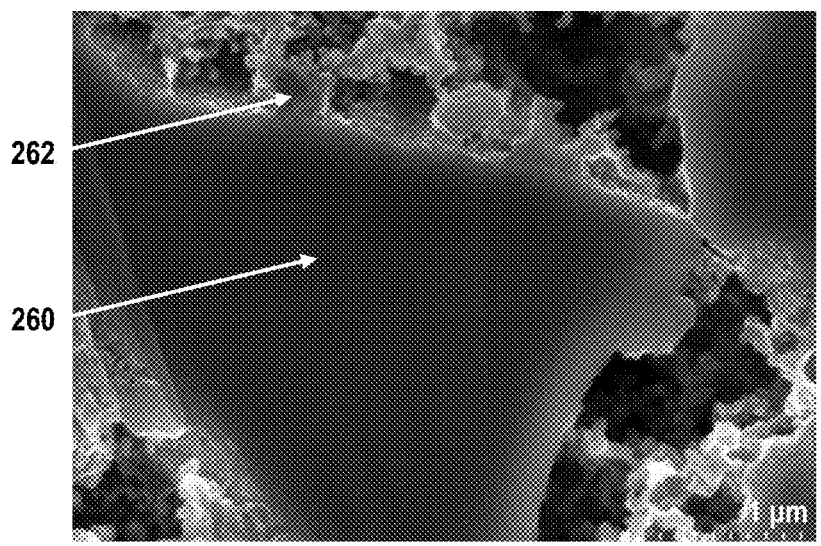
FIG. 5 is a scanning electron microscopy (SEM) image of a comparative silicon particle having a carbon coating, but having no oxidized interlayer.
Figure 6:
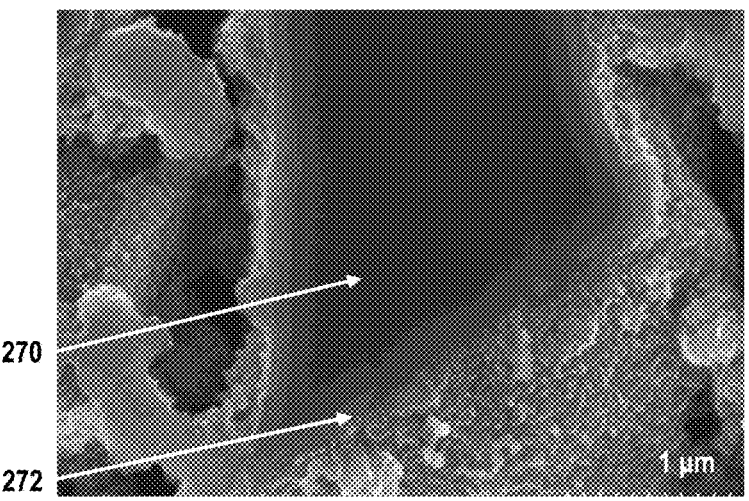
FIG. 6 is a scanning electron microscopy (SEM) image of a silicon particle having a multilayered carbon coating formed on an intermediate layer in accordance with certain aspects of the present disclosure.

FIGS. 4-6 show cross-sectional SEM images of the electrodes prepared by an ion-milling method. FIG. 4 shows an uncoated silicon particle 250 for purposes of comparison. FIG. 5 shows a comparative example of a silicon particle 260 coated with carbon 262, but having no pretreatment or oxidation step. The coated silicon 260 in this micrograph is synthesized directly in 10% $CH_4$ in argon and the sample is heated up to 1000° C. for 2 hours without any pre-treatment step. As can be observed in FIG. 5, the carbon coating 262 formed on the surface of silicon particle 260 is not continuous and the coating thickness is not consistent.

FIG. 6 shows a silicon particle 270 prepared in accordance with certain aspects of the present disclosure, where the silicon particle 270 is subjected to an oxidation step to form an intermediate oxidation layer prior to pyrolysis of a carbon-containing precursor to form the multilayered carbon coating 272. The silicon metal particles 270 are first treated in 10% $O_2$ in helium at 800° C. for 10 minutes. Then the atmosphere is switched to 10% $CH_4$ in argon and the sample is heated up to 1000° C. for 2 hours for carbon deposition. As can be seen in FIG. 6, a continuous carbon coating 272 is formed on the surface of silicon particles 270 and the coating thickness is uniform.

Figure 7:
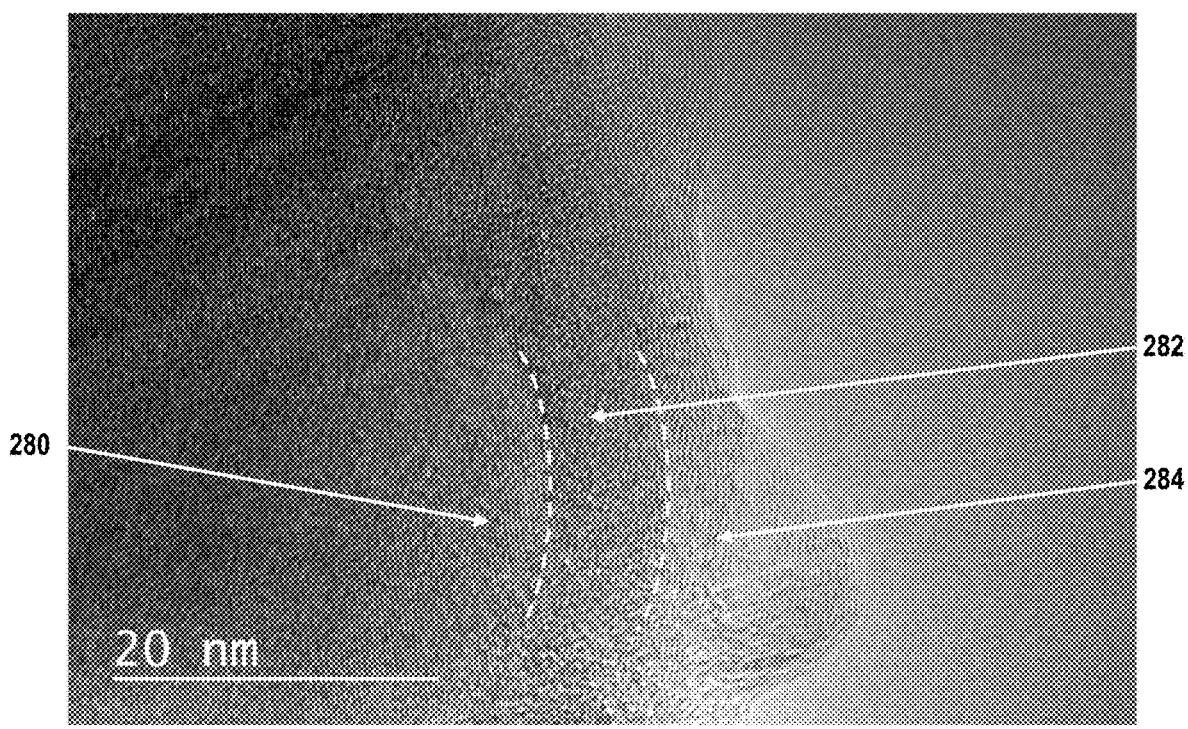
FIG. 7 shows a transmission electron microscopy (TEM) image of a silicon particle having a multilayered carbon coating formed on an intermediate layer in accordance with certain aspects of the present disclosure with a 20 nm scale bar.
Figure 8:
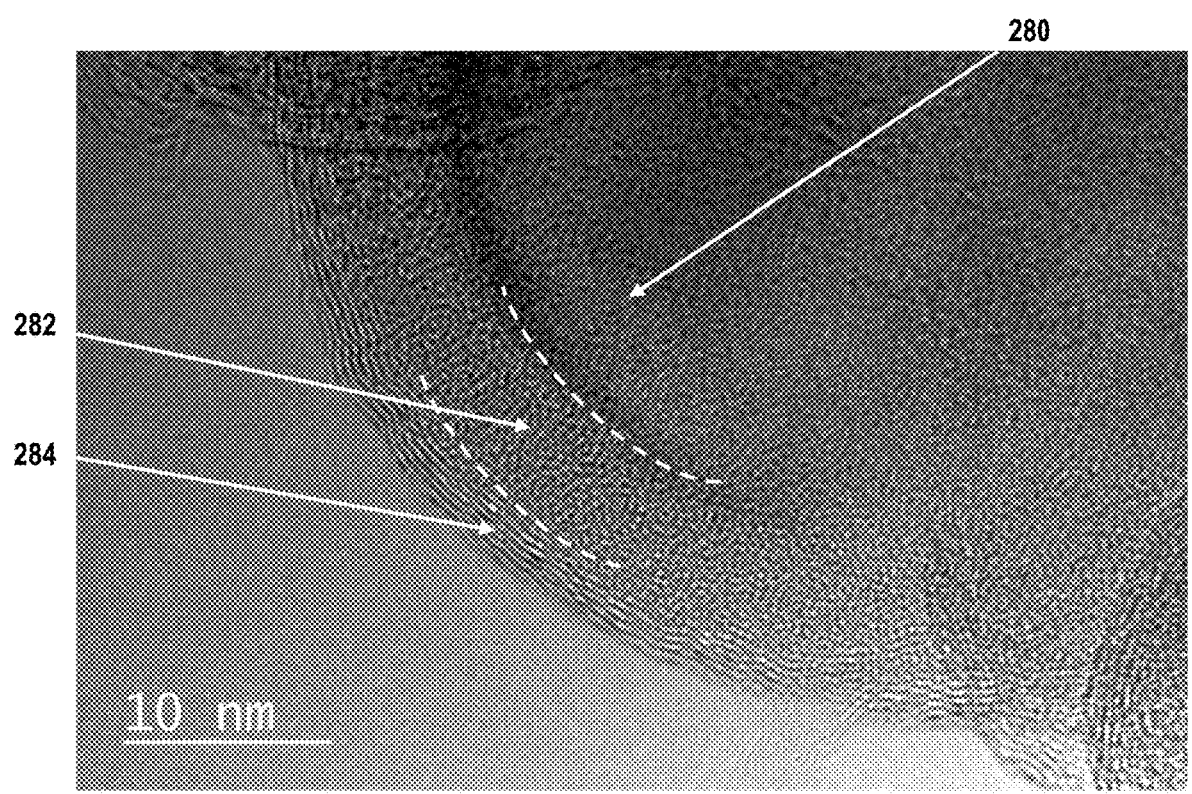
FIG. 8 shows a transmission electron microscopy (TEM) magnified image of the silicon particle in FIG. 7 prepared in accordance with certain aspects of the present disclosure with a 10 nm scale bar.

FIGS. 7-8 show cross-section TEM images of the electrodes prepared in accordance with certain aspects of the present disclosure at 20 nm and 10 nm scale, respectively. More specifically, FIGS. 7-8 show silicon nanoparticles 280 prepared in accordance with certain aspects of the present disclosure, where the silicon particles 280 are subjected to an oxidation step to form an intermediate oxidation layer prior to pyrolysis of a carbon-containing precursor to form a multilayered carbon coating. As can be seen between silicon particles 280 and a carbon coating 284, a transition layer 282 is observed (dark field in the TEM image) related to the intermediate layer of silicon oxides or silicon carbide. In the multilayered carbon coating, an amorphous carbon inner layer like transition layer 282 is thus formed adjacent to the silicon particle 280 in the core region, while a graphitic carbon layer 284 defines an outer exposed surface.

EXAMPLE 2

Silicon negative electrodes composed of 80 wt. % active material (uncoated Si or carbon-coated Si), 10 wt. % carbon black and 10 wt. % binder are prepared. Super P is used as the carbon black and Carboxymethyl cellulose (CMC) as the binder. The active material and carbon black are first mixed using a mortar and a pestle, and then mixed with the binder solution using a mixer. The electrode slurries are then coated on Cu foils, and dried under vacuum at 80° C. overnight.

Coin-type battery half-cells (2032) are fabricated inside an Ar-filled glovebox using silicon as working electrodes and lithium (Li) foil as a counter electrode. An electrolyte comprising 1M $LiPF_6$ in 50% ethylene carbonate (EC) and 50% diethyl carbonate (DEC) (EC:DEC=1:2 by weight), with 10% fluoroethylene carbonate (FEC) by weight is used, along with and a Celgard™ 2320 separator. The silicon working electrodes are formed by including the comparative silicon-containing electroactive particles mixed with a carboxymethyl cellulose (CMC) binder and a Super P carbon black in a weight ratio of 80:10:10.

The battery half-cell is then tested to determine capacity retention over various charge/discharge cycles. More specifically, galvanostatic cycling is performed using an Arbin cycler, including 3 formation cycles at a charge/discharge rate of C/20 followed by cycling at C/5. The galvanostatic voltage cutoffs are 0.01V and 1.5 V vs Li/Li+ for formation cycles and 0.05V and 1.5 V vs Li/Li+ for the C/5 cycling.

Figure 9:
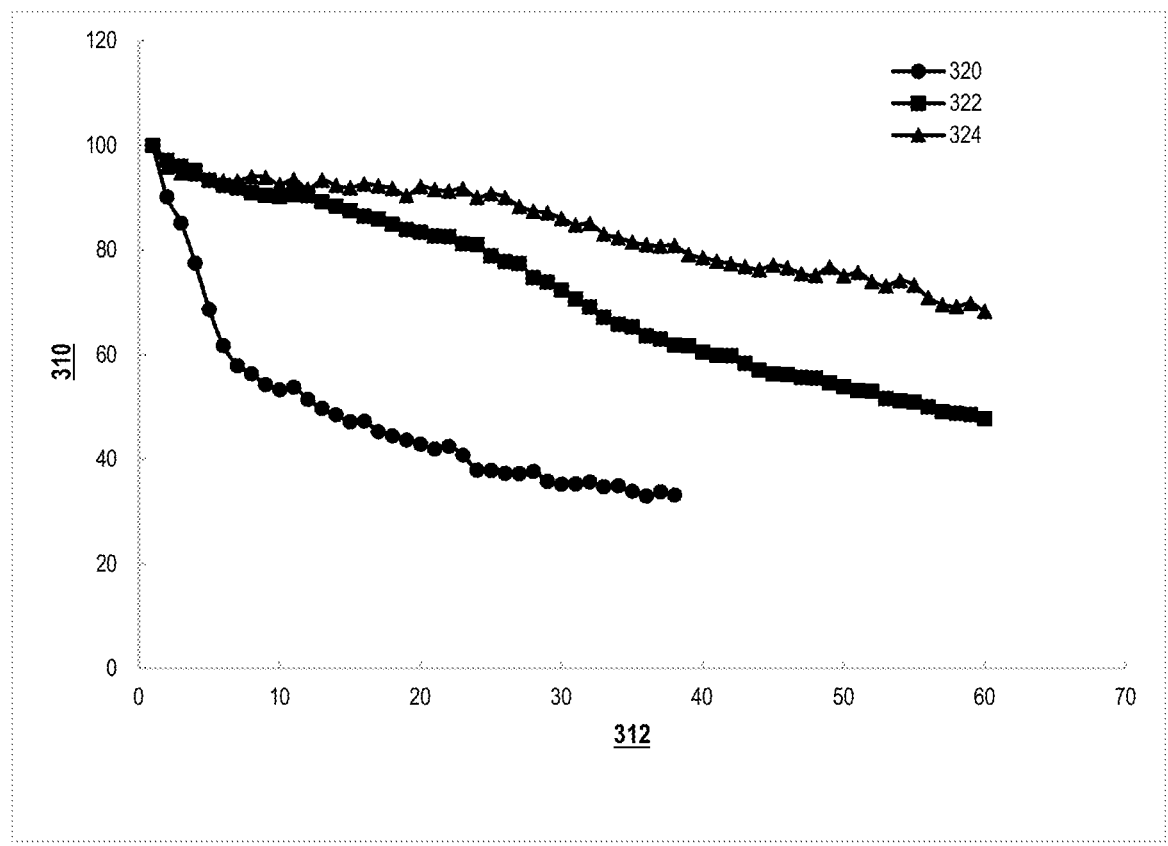
FIG. 9 shows comparative capacity retention performance of negative electrodes in a half-cell having an uncoated silicon, a comparative silicon particle having a carbon coating, but having no oxidized interlayer, and a silicon particle having a multilayered carbon coating formed on an intermediate layer in accordance with certain aspects of the present disclosure.

FIG. 9 shows comparative capacity retention performance of discharge capacity retention (%) shown as y-axis 310 and cycle number (312) as an x-axis. More specifically, performance of negative electrodes in a half-cell having an uncoated silicon 320, a comparative silicon particle having a carbon coating, but having no oxidized interlayer labeled 322, and a silicon particle having a multilayered carbon coating formed on an intermediate layer in accordance with certain aspects of the present disclosure labeled 324 are shown.

As can be seen, uncoated comparative silicon-containing electrodes 320 had a rapid decline in discharge capacity retention and reached only 40 cycles when the discharge capacity fell to about 30%. For a comparative silicon-containing electrode having a carbon coating, but having no pretreatment with an oxidation step 322, the performance is improved over the uncoated silicon, but at 60 cycles, the discharge capacity retention is only about 50%. For a silicon-containing subjected to an oxidation step to form an intermediate oxidation layer prior to pyrolysis to form a carbon coating in accordance with certain aspects of the present disclosure 324, capacity retention is about 70% at 60 cycles, which is significantly enhanced as compared to the comparative examples, including the carbon coated silicon-containing electrode with no oxidation intermediate layer 322.

Figure 10:
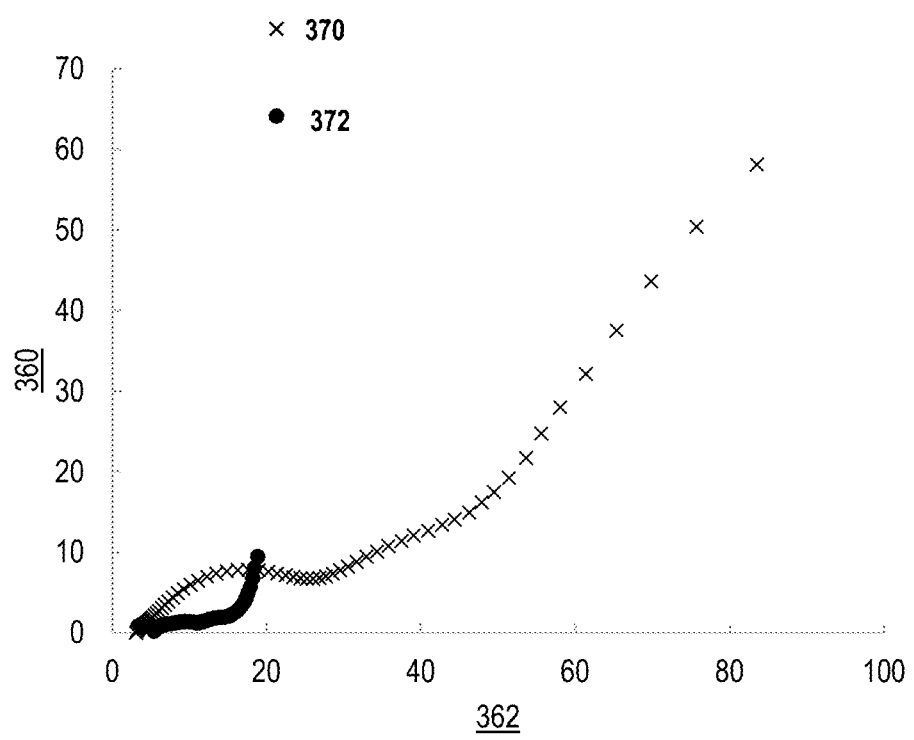
FIG. 10 shows comparative performance of negative electrodes in a half-cell having an uncoated silicon and a comparative silicon particle having a carbon coating prepared in accordance with certain aspects of the present teachings.

FIG. 10 shows impedance by a y-axis 360 of $-\ln(Z)$ (Ohm) versus an x-axis 362 of Re(Z) (Ohm). More specifically, FIG. 10 shows comparative performance of negative electrodes in a half-cell like that described above having an uncoated silicon 370 versus a comparative silicon particle having a carbon coating 372 prepared in accordance with certain aspects of the present teachings where the silicon particle is pretreated as described above to form an intermediate layer comprising silicon oxides followed by pyrolysis to form the carbon coating. As can be seen in FIG. 10, the impedance increases substantially for the uncoated silicon 370.

EXAMPLE 3

Figure 11:
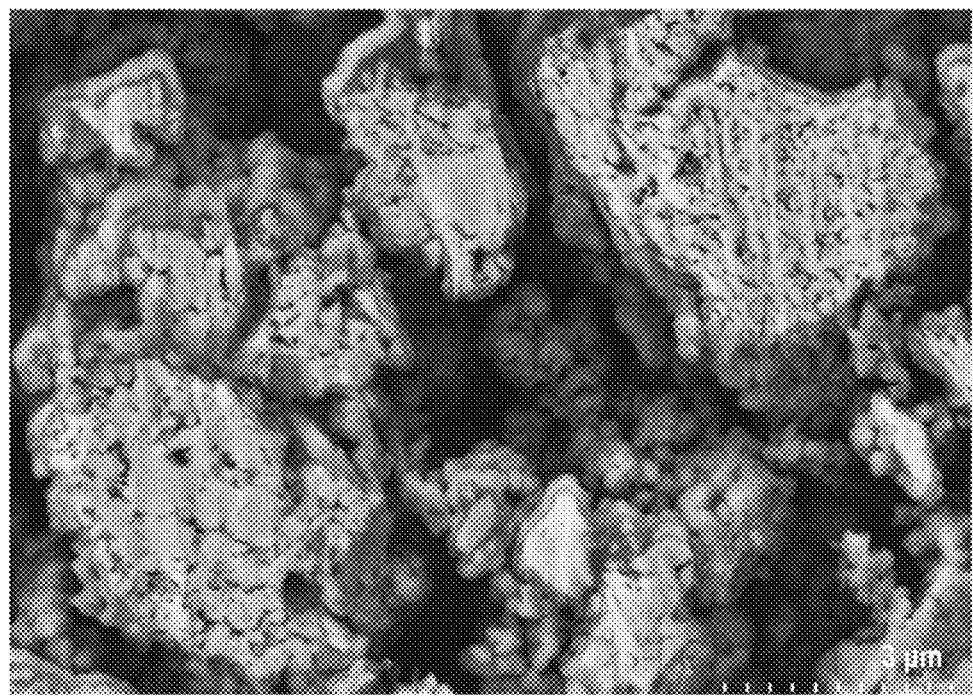
FIG. 11 is a scanning electron microscopy (SEM) image of a cross-section of an uncoated silicon particle after 65 cycles of battery operation.
Figure 12:
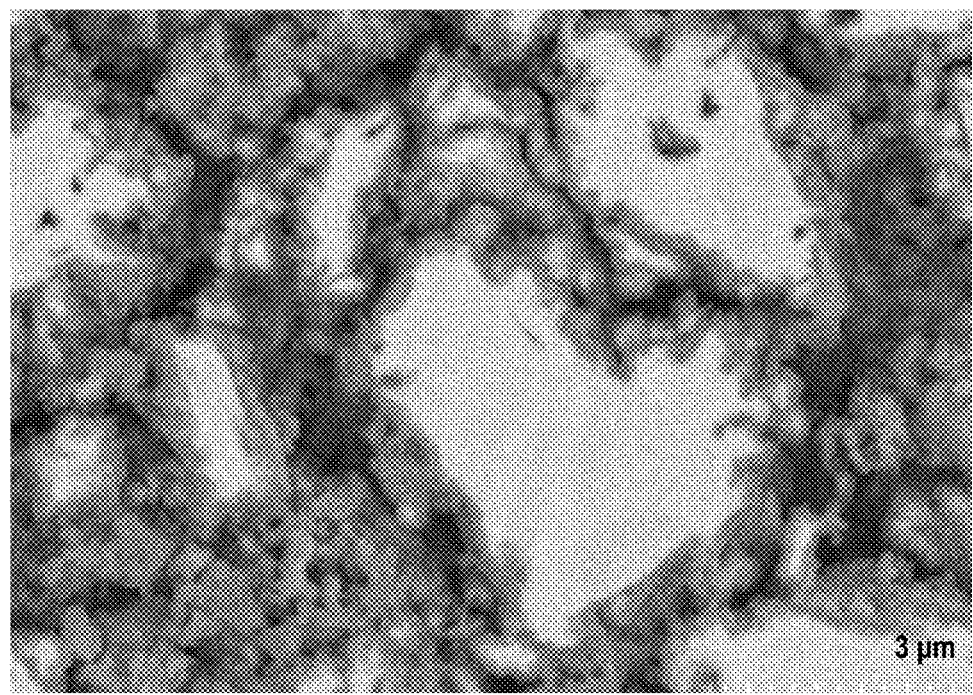
FIG. 12 is a scanning electron microscopy (SEM) image of a cross-section of a silicon particle having a multilayered carbon coating formed on an intermediate layer in accordance with certain aspects of the present disclosure after 65 cycles of battery operation.

Silicon negative electrodes are prepared and tested in half-cells like those described in Example 2 having an uncoated silicon (FIG. 11) and a silicon particle having a multilayered carbon coating formed on an intermediate layer in accordance with certain aspects of the present disclosure (FIG. 12). After 65 cycles, carbon-coated silicon electrodes (FIG. 12) demonstrate less internal cracking of the silicon particle compared with the uncoated silicon electrodes (FIG. 11).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a negative electrode material for an electrochemical cell that cycles lithium ions, the method comprising:
    treating a surface of a negative electrode material with an oxidant at a first temperature of greater than or equal to about 200° C. to less than or equal to about 1,000° C. to form a continuous intermediate layer comprising oxides, wherein the negative electrode material is selected from the group consisting of: silicon, silicon-containing alloys, tin-containing alloys, and combinations thereof and the oxidant is selected from the group consisting of: oxygen ($O_2$), ozone ($O_3$), carbon monoxide (CO), and combinations thereof; and pyrolyzing a carbon-containing precursor over the continuous intermediate layer at a second temperature of greater than or equal to about 600° C. to form a continuous carbon coating thereon, wherein the continuous carbon coating comprises both graphitic carbon and amorphous carbon and the treating and the pyrolyzing are conducted in a same reaction chamber of a gas-phase reactor, the oxidant is introduced by a first gas stream and is present in the gas-phase reactor at greater than or equal to about 1% by weight to less than or equal to about 50% by weight of an overall atmosphere in the gas-phase reactor with a balance of the overall atmosphere being an inert gas during the treating, and the carbon-containing precursor is introduced by a second gas stream and is present in the gas-phase reactor at about 10% by weight of the overall atmosphere in the gas-phase reactor.

2. The method of claim 1, wherein during the pyrolyzing, at least a portion of the oxides in the intermediate layer transform to carbides.

3. The method of claim 1, wherein the second temperature range is greater than or equal to about 600° C. to less than or equal to about 1,400° C.

4. The method of claim 1, wherein the continuous carbon coating comprises greater than or equal to about 20% by volume to less than or equal to about 50% by volume of graphitic carbon and greater than or equal to about 50% by volume to less than or equal to about 80% by volume of amorphous carbon.

5. The method of claim 1, wherein the intermediate layer has a thickness of greater than or equal to about 1 nm to less than or equal to about 20 nm.

6. The method of claim 1, wherein the continuous carbon coating has a thickness of greater than or equal to about 1 nm to less than or equal to about 200 nm.

7. The method of claim 1, wherein the continuous carbon coating defines an inner first region adjacent to the intermediate layer and an outer second region disposed over the inner first region, wherein the first region comprises amorphous carbon and has a thickness of greater than or equal to about 1 nm to less than or equal to about 150 nm, and the second region comprises graphitic carbon and has a thickness of greater than or equal to about 1 nm to less than or equal to about 50 nm.

8. The method of claim 1, wherein the carbon-containing precursor comprises a hydrocarbon gas selected from the group consisting of: methane ($CH_4$), ethane ($C_2H_6$), propane ($C_3H_8$), butane ($C_4H_{10}$), pentane ($C_5H_{12}$), hexane ($C_6H_{14}$), heptane ($C_7H_{16}$), octane ($C_8H_{18}$), acetylene ($C_2H_2$), toluene ($C_7H_8$), natural gas, and combinations thereof.

9. The method of claim 1, wherein one or more of the treating and the pyrolyzing are conducted in the presence of an additive selected from the group consisting of: ammonia ($NH_3$), hydrogen ($H_2$), carbon monoxide (CO), and combinations thereof.

10. A method of making a negative electrode material for an electrochemical cell that cycles lithium ions, the method comprising:

treating a surface of a negative electrode material with a first gas comprising an oxidant in a reaction chamber of a gas-phase reactor having a first temperature of greater than or equal to about 200° C. to less than or equal to about 1,000° C. to form a continuous intermediate layer comprising oxides, wherein the gas-phase reactor comprises greater than or equal to about 1% by weight to less than or equal to about 50% by weight of the oxidant in an overall atmosphere in the gas-phase reactor with a balance of the overall atmosphere being an inert gas, the negative electrode material is selected from the group consisting of: silicon, silicon-containing alloys, tin-containing alloys, and combinations thereof and the oxidant is selected from the group consisting of: oxygen ($O_2$), ozone ($O_3$), carbon monoxide (CO), and combinations thereof;

cooling the negative electrode material having the continuous intermediate layer to a temperature of less than or equal to about 100° C.; and introducing a second gas comprising a carbon-containing precursor into the reaction chamber of the gas-phase reactor having a second temperature of greater than or equal to about 600° C. until the carbon-containing precursor is present in the gas-phase reactor at about 10% by weight of the overall atmosphere in the gas-phase reactor to pyrolyze the carbon-containing precursor to form a multilayered continuous carbon coating over the continuous intermediate layer, wherein the multilayered continuous carbon coating comprises a first layer comprising amorphous carbon and a second layer comprising graphitic carbon.

11. The method of claim 10, wherein the oxides in the intermediate layer transform to carbides as the continuous carbon coating is formed.

12. The method of claim 10, wherein the second temperature range is greater than or equal to about 600° C. to less than or equal to about 1,400° C.

13. The method of claim 10, wherein the first layer is greater than or equal to about 20% by volume to less than or equal to about 50% by volume of the continuous carbon coating and the second layer is greater than or equal to about 50% by volume to less than or equal to about 80% by volume of the continuous carbon coating.

14. The method of claim 10, wherein the continuous carbon coating has a thickness of greater than or equal to about 2 nm to less than or equal to about 200 nm, the first layer has a thickness of greater than or equal to about 1 nm to less than or equal to about 150 nm, and the second layer has a thickness of greater than or equal to about 1 nm to less than or equal to about 50 nm.

15. The method of claim 10, wherein the carbon-containing precursor comprises a hydrocarbon gas selected from the group consisting of: methane ($CH_4$), ethane ($C_2H_6$), propane ($C_3H_8$), butane ($C_4H_{10}$), pentane ($C_5H_{12}$), hexane ($C_6H_{12}$), heptane ($C_7H_{16}$), octane ($C_8H_{18}$), acetylene ($C_2H_2$), toluene ($C_7H_8$), natural gas, and combinations thereof.

* * * * *